Nov. 6, 1956   M. WOOLDRIDGE   2,769,625
SWINGABLE MOUNT FOR RIPPER BLADE
Filed Jan. 18, 1955   3 Sheets-Sheet 1
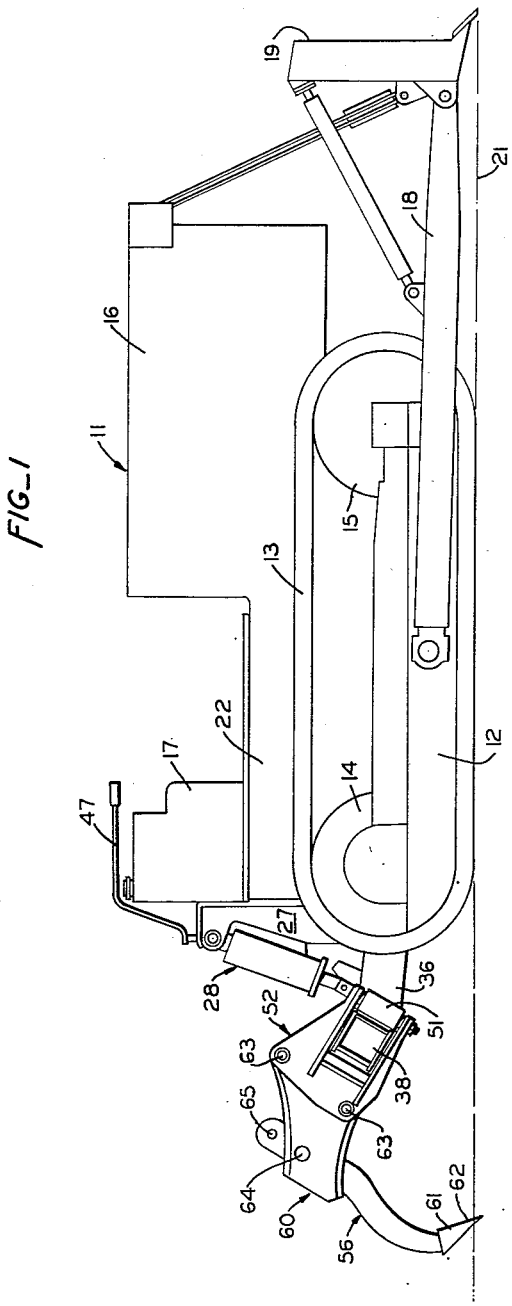
INVENTOR.
MACK WOOLDRIDGE
ECKHOFF & SLICK
ATTORNEYS
BY
A MEMBER OF THE FIRM Nov. 6, 1956 M. WOOLDRIDGE 2,769,625
SWINGABLE MOUNT FOR RIPPER BLADE
Filed Jan. 18, 1955 3 Sheets-Sheet 2
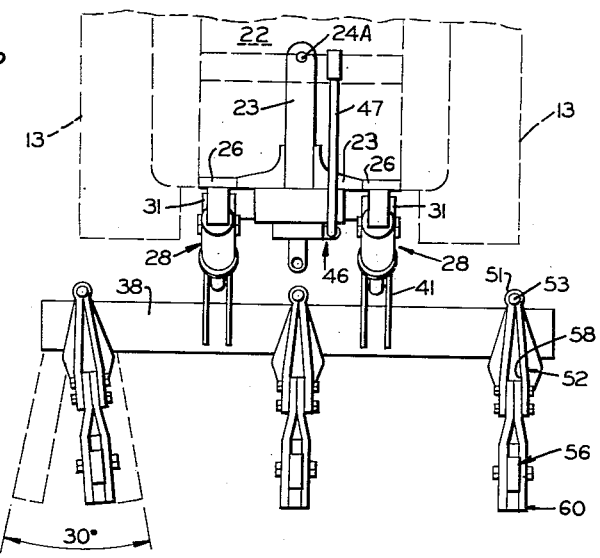
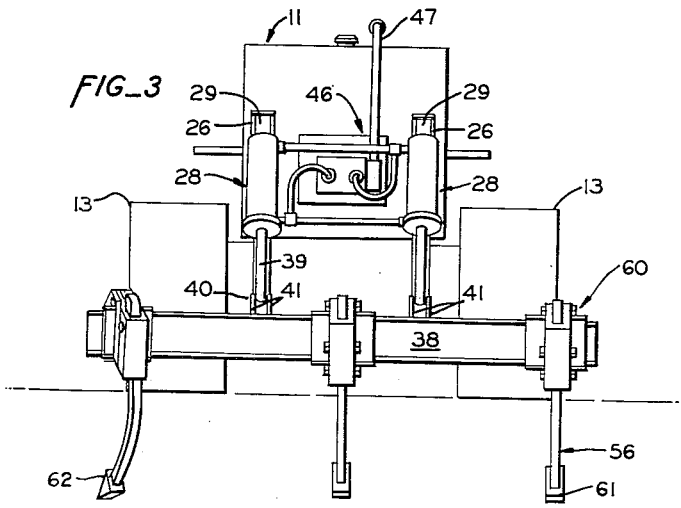
INVENTOR.
MACK WOOLDRIDGE
ECKHOFF & SLICK
ATTORNEYS
BY
A MEMBER OF THE FIRM Nov. 6, 1956   M. WOOLDRIDGE   2,769,625
SWINGABLE MOUNT FOR RIPPER BLADE
Filed Jan. 18, 1955   3 Sheets-Sheet 3
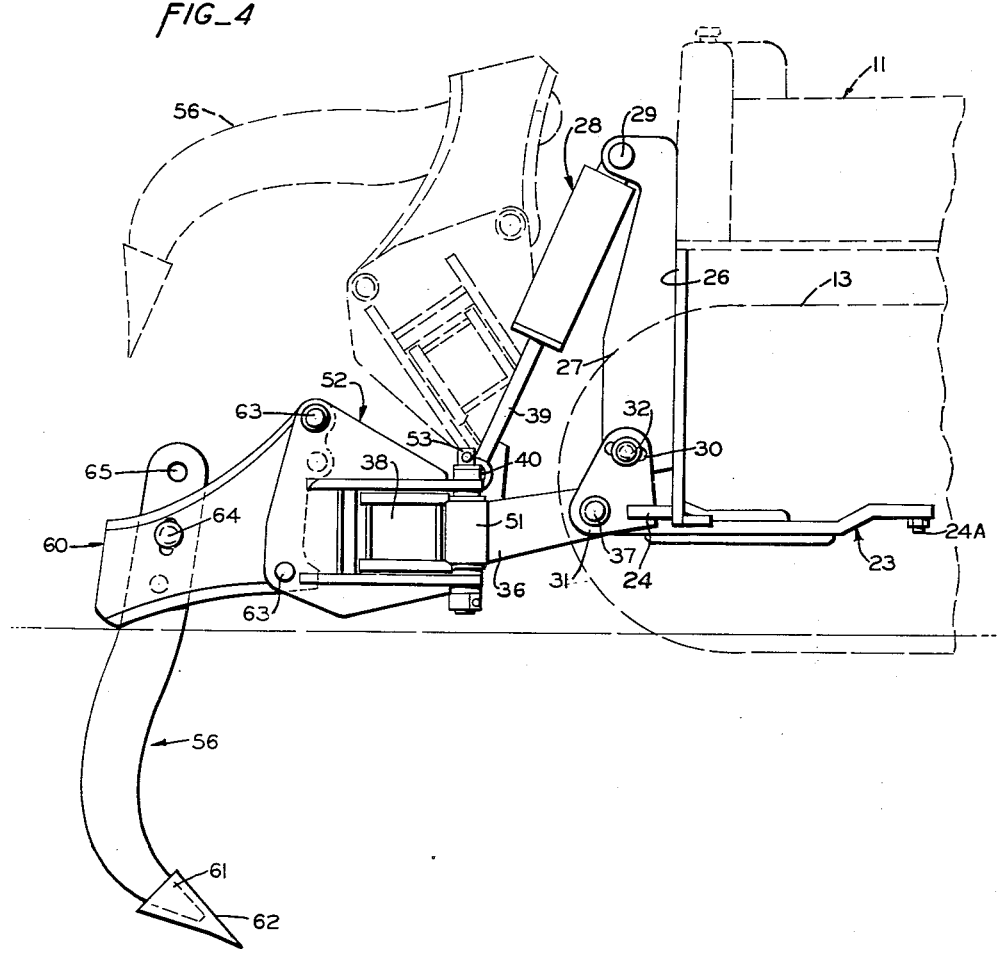
FIG_4
INVENTOR.
MACK WOOLDRIDGE
ECKHOFF & SLICK
ATTORNEYS
BY
A MEMBER OF THE FIRM United States Patent Office 2,769,625
Patented Nov. 6, 1956

2,769,625

SWINGABLE MOUNT FOR RIPPER BLADE

Mack Wooldridge, Oakland, Calif., assignor to American Tractor Equipment Corporation, a corporation of California Application January 18, 1955, Serial No. 482,492

6 Claims. (Cl. 262—8)

This invention relates to an improved ripper adapted to be mounted upon a dirigible vehicle such as a track-type tractor. The invention will be particularly described as it has been applied to a ripper mounted at the rear end of such a tractor but it will be obvious that the ripper can be mounted upon some other type of dirigible vehicle and at the front end.

The ripper of the present invention is particularly designed for use in the ripping of dirt, rock, roots and the like, and this at a substantial distance beneath the surface of the ground.

It is in general the broad object of the present invention to provide an improved ripping device for earth, roots, rock and the like which can be operated successfully at a considerable distance beneath the surface of the earth to effect deep ripping.

In addition to the foregoing, the ripper of this invention includes other objects and features of advantage, some of which, together with the foregoing, will appear hereinafter wherein the preferred embodiment of the ripper of this invention is disclosed. In the drawing accompanying and forming a part hereof, Figure 1 is a side elevation showing the ripper of the present invention mounted upon a track-laying type tractor and in position for initial ground engagement.

Figure 2 is a fragmentary plan view of the rear of the tractor showing the details of the mounting of the ripper.

Figure 3 is a rear view of the structure shown in Figure 2.

Figure 4 is an enlarged side elevation showing various mountings of the ripper at the rear of the tractor.

Referring to the drawings, a track-laying type tractor has been generally indicated at 11, this including opposite track frame 12 on each side of the tractor, each having a flexible track 13 extended thereabout between sprockets 14 and 15 at each end of the track frames. The tractor is driven by an engine, generally indicated at 16, and extending forwardly between the track frames 12. An operator's station, generally indicated at 17, is included and from which the vehicle is operated in a manner well-known in the art. In the form of tractor shown in the drawings, pusher arms 18 extend forwardly from each of the track frames 12 and support a blade 19, the supporting arms 18 and the blade 19 being adapted to be raised and lowered relative to the ground level, generally indicated at 21, by a mechanism not shown; in place of a blade, one can use a bucket mechanism, as is well-known in the art.

Mounted between the track frames at the rear of the tractor and providing a support for the sprockets 14, in a manner well-known in the art, is the main frame of the tractor, generally indicated at 22. This frame, as is also well-known, is particularly designed to withstand heavy traction loads and shocks. In accordance with this invention, a draw-bar, generally indicated at 23, is attached at its forward end to the tractor main frame 22 as by the stud and nut indicated at 24A. At its rear end, the draw-bar 23 is provided with a transverse member 24 and, at opposite ends of the transverse member 24, pairs of plates 31 are secured (Figures 2 and 4). Vertical brackets 26 extend upwardly, being secured by studs, not shown, on opposite sides of the transmission case provided at the rear of the tractor main frame. A cylinder support 27 is mounted upon each of the brackets 26 to provide support for each of the cylinder and piston structures, generally indicated at 28, and which are hinged as at 29 upon each of the brackets 27. Each pair of plates 31 is provided on each side of one of cylinder supports 27, the plates and brackets being secured by pins 32.

The draw-bar is mounted at the rear of the tractor; it is a feature of this invention that the draw-bar can move slightly side-to-side with respect to the tractor and so dampen vibration imparted by the ripper. To this end, the receptacle for pins 32 in each of supports 27 is made slightly elongated, as is indicated at 30 (Figure 4), so the draw-bar can move. Mounted between the lower ends of each of the plates 31 are spaced arms 36 secured at one end between plates 31 by pins 37; the other end of each arm 36 is secured to a transverse hollow beam 38 (Figure 2). A piston rod 39, extended from each of the cylinder-piston structures 28, is hinged by pin 40 to ears 41 secured to the beam 38 (Figure 3).

Hydraulic fluid under pressure is supplied selectively to each of the cylinders and piston structures 28 under control of a valve mechanism, generally indicated at 46, and operated by control lever 47 which extends to the operator's station 17. This enables the hollow beam 38 and any attached devices to be raised or lowered or held at a selected position by the operator.

In accordance with this invention, one or more ripper blades are mounted selectively across the beam 38; a description of one will suffice for a description of the others. A bearing structure, generally indicated at 51, is mounted on a forward vertical face of the beam 38, three such bearings being shown in the drawing. A U-shaped bracket, generally indicated at 52, is extended about the beam and a pin 53 is extended through the forward end of each bracket and through a bearing structure 51 to mount the bracket for limited transverse swinging movement with respect to the beam 38. Each of the brackets 52 is bifurcated to provide a support for a ripper blade mounting, generally indicated at 60, each mounting being held in position at the rear end of the bifurcated bracket 52 by pairs of pins 63 which are mounted in suitably spaced cooperating apertures provided in the rear of each bracket 52. Each ripper blade mounting 52 can be reversed in position by removing pins 63 and turning the mounting 180° and then returning the mounting to the bracket; such change in position can be observed by comparing the dotted line position of the mounting with its full line position in Figure 4. This enables the ripper blade to be mounted at different elevations so that the point of the ripper blade is mounted at different elevations with respect to a given, fixed elevation whereby the blade point is effective to rip at different depths.

Each mounting is slotted to receive a ripper blade 56, this being held at a desired elevation in the mounting by a pin 64 passed through suitable apertures in the mounting and through a selected one of the apertures 65 in the upper blade. This enables a ripper blade to be mounted selectively at different elevations with respect to the elevation of beam 38.

In accordance with this invention, each ripper blade 56 includes a shank which may be straight or curved and which extends forwardly and downwardly to a pointed end upon which is removably mounted a hardened, sharpened cutting or breaking boot or point 61. The boot or point includes a flat forward face 62, which is adapted to engage the ground initially at an angle conducive to penetration, just less than 90°, as is shown in Figure 1. When lowered into final working position, the angle of the flat face 62 with respect to the horizontal is preferably 35°. I term this angle the "attack angle," and I have found the foregoing value to be relatively critical because, when the attack angle is approximately 35°, the point digs in the ground as the vehicle is moved forwardly, tending to pull the rear end of the tractor down into close engagement with the ground.

The swing permitted between each of the U-shaped brackets 52 and the cross-bar 38 is such as to permit a swinging movement through a total arc of 30°, 15° on each side of the vertical plane normal to the longitudinal axis of the beam. Also, each of the blades can swing independently so that a blade seeks the path of least resistance through the dirt, rock or shale. This is particularly indicated in Figures 2 and 3, wherein the blade on the left-hand side of the vehicle is shown in a position wherein the blade has swung slightly away from the normal. Taken with the freedom of movement of the draw-bar, a simple, rugged and improved ripper is provided which can be used successfully in achieving deep underground ripping.

I claim:

1. In a tool of the character described, a horizontal beam, a plurality of spaced bearings disposed vertically along a forward face of said beam and each providing a separate mounting for a ripper blade, a plurality of U-shaped brackets extended about said beam, each bracket having its end hingedly supported by one of said bearings, and a ripper blade supported by each bracket and freely movable about a vertical axis with respect to said beam.

2. A tool as in claim 1 in which the ripper blade is supported on the barcket by a non-symmetrical member which can be mounted in either of two selected positions 180° apart to support the blade on the bracket in either of two different elevational positions with respect to the bracket.

3. In a tool of the character described, a horizontal beam, a plurality of U-shaped brackets positioned about the beam with the arms of said U extending forwardly of said beam, a plurality of vertical bearings mounted forwardly of the rear face of said beam and each engaged with the ends of one of said U-shaped brackets to support said bracket for a free swinging movement with respect to said beam about a vertical axis, and a ripper blade supported in each bracket.

4. In a tool of the character described, a horizontal beam, a plurality of U-shaped brackets positioned about the beam with the arms of said U extending forwardly of said beam, a plurality of bearings each mounted forwardly of the rear face of said beam and each engaged with the ends of a U-shaped bracket to support said bracket for a free swinging movement with respect to said beam about a vertical axis, the rear end of each bracket being bifurcated to receive a ripper blade, and a ripper blade supported in the bifurcated bracket end, the rear end of each blade and of the bracket including pairs of spaced apertures adapting the blade for mounting at different elevations with respect to the beam.

5. In a tool of the character described, a horizontal beam, a plurality of spaced bearings disposed vertically along a forward face of said beam and each providing a separate mounting for a ripper blade, a plurality of U-shaped brackets, each having a pair of spaced parallel and opposite legs extended forward from the bracket on opposite sides of the beam, the forward ends of the said pair of legs being hingedly supported by one of said bearings mounted on the forward face of said beam to permit each U-shaped bracket to swing freely and independently about a vertical axis on each side of a trailing position in which the bracket extends normally to the beam, and a ripper blade supported on each bracket for selective ground engagement.

6. A tool as in claim 5 in which the ripper blade is supported on the bracket by a non-symmetrical member which can be mounted in either of two selected positions 180° apart to support the blade on the bracket in either of two different elevational positions with respect to the bracket.

References Cited in the file of this patent

UNITED STATES PATENTS

| | | |
|---|---|---|
| 1,050,993 | Orr et al. | Jan. 21, 1913 |
| 1,948,509 | Carter | Feb. 27, 1934 |
| 2,134,438 | Click | Oct. 25, 1938 |
| 2,163,999 | Jacks | June 27, 1939 |
| 2,385,950 | Silver | Oct. 2, 1945 |
| 2,648,268 | Lindeman | Aug. 11, 1953 |
| 2,660,938 | Kaupke | Dec. 1, 1953 |

FOREIGN PATENTS

| | | |
|---|---|---|
| 547,289 | Great Britain | Aug. 21, 1942 |